United States Patent
Jubran et al.

(10) Patent No.: US 9,923,775 B2
(45) Date of Patent: Mar. 20, 2018

(54) DATACENTER TOPOLOGY DEFINITION SCHEMA

(71) Applicant: MICROSOFT TECHNOLOGY LICENSING, LLC., Redmonde, WA (US)

(72) Inventors: Marwan E. Jubran, Redmond, WA (US); Aleksandr M. Gershaft, Redmond, WA (US); Vitalii Tsybulnyk, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 440 days.

(21) Appl. No.: 14/557,402

(22) Filed: Dec. 1, 2014

(65) Prior Publication Data

US 2016/0156522 A1    Jun. 2, 2016

(51) Int. Cl.
G06F 15/16    (2006.01)
H04L 12/24    (2006.01)

(52) U.S. Cl.
CPC .................................... *H04L 41/12* (2013.01)

(58) Field of Classification Search
CPC .............................. H04L 41/12; H04L 43/065
USPC ........................................ 709/224, 220, 251
See application file for complete search history.

(56) References Cited

U.S. PATENT DOCUMENTS

| | | | |
|---|---|---|---|
| 6,966,003 B1 * | 11/2005 | Joseph | H04L 9/00 370/216 |
| 2011/0029673 A1 | 2/2011 | Jaisinghani | |
| 2011/0029810 A1 * | 2/2011 | Jaisinghani | H04L 41/12 714/4.1 |
| 2013/0198346 A1 | 8/2013 | Jubran et al. | |
| 2013/0204918 A1 | 8/2013 | Ashok et al. | |
| 2013/0250802 A1 | 9/2013 | Yalagandula et al. | |
| 2013/0346260 A1 | 12/2013 | Jubran et al. | |

(Continued)

OTHER PUBLICATIONS

"EMC Networked Storage", Published on: Dec. 2003, Available at: ftp://ftp.emc.com/pub/elab/docs/Topo.pdf.

(Continued)

*Primary Examiner* — Bryan Lee
*Assistant Examiner* — Oluwatosin Gidado
(74) *Attorney, Agent, or Firm* — Shook, Hardy & Bacon L.L.P.

(57) ABSTRACT

In various embodiments, methods and systems for modeling or representing hardware inventory based on a topology definition is provided. A topology definition having physical elements and logical elements corresponding to a physical topology layer and a logical topology layer is received. An instance definition for a rack, cluster, or datacenter for a hardware management operation is received. The instance identifies a physical topology and a logical topology for the operation. A hardware management service is executed, based on the topology definition and the instance definition, to manage the hardware inventory of the topology definition. Hardware management of the hardware inventory corresponding to the separately defined physical elements and logical elements is performed with attributes that are defined in the schema. The topology definition can include precision levels that indicate a hierarchical classification of topology components classified at a device level, a rack level, a cluster level, and a datacenter level.

20 Claims, 6 Drawing Sheets

(56) References Cited

U.S. PATENT DOCUMENTS

2014/0101467 A1    4/2014  Jubran et al.
2015/0012625 A1*  1/2015  Patwardhan ........ H04L 61/2015
                                                            709/221
2016/0285694 A1*  9/2016  Maes .................... G06F 9/5072

OTHER PUBLICATIONS

"Integrating Physical and Virtual Datacenter Resources with VMware NSX and Arista Networks", In Technical Whitepaper, Aug. 21, 2014, 30 pages.

* cited by examiner

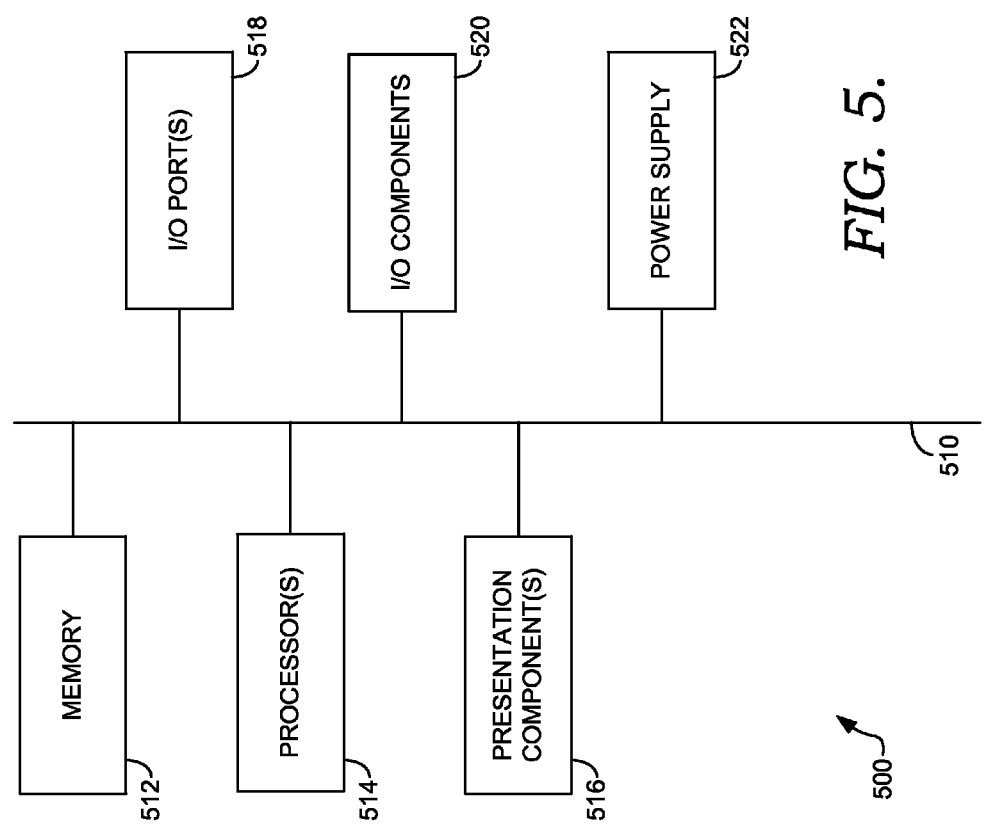

DATACENTER TOPOLOGY DEFINITION SCHEMA

BACKGROUND

A datacenter generally includes a pool of resources—computation, storage, power and network—interconnected in a communication network. A datacenter topology may include the arrangement of various resources in the datacenter. Essentially, the datacenter topology is the structure of the datacenter. A datacenter topology representation may be utilized in different processes in datacenter management. Hardware management can include operating a hardware inventory, building out a hardware inventory, and incorporating the hardware inventory into cloud computing infrastructure through hardware bootstrapping, repair, retrofit, decommissioning. As such, an accurate representation of the datacenter may facilitate the process of discovering, validating, and configuring hardware inventory for a datacenter.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide for modeling or representing a datacenter based on a topology definition schema data structure having separated representations of physical topology layers and logical topology layers. The physical topology layer can be represented by physical elements and the logical topology layer can be represented by logical elements. As such, the topology definition allows for hardware management of separately defined physical elements and logical elements with corresponding attributes that are defined in the schema. The physical topology layer includes devices (e.g., network devices, serial, power, chassis device, and blades), wiring rules between the devices, and a physical configuration that indicates device settings that enable proper functioning of the devices. The logical topology layer includes device roles (e.g., top of rack (TOR) switch, spine, serial aggregator, fabric, and compute). The logical topology also includes logical configuration that indicates device settings that enable proper functioning of the device in roles associated with the devices.

In one embodiment, the topology definition schema includes precision levels. A precision level can be associated with either one or both of the physical topology layer and the logical topology layer. Precision levels indicate a hierarchical classification of topology components, where components can be classified at a device level, a rack level, a cluster level, and a datacenter level each represented as a separate precision level.

BRIEF DESCRIPTION OF THE DRAWINGS

The present invention is described in detail below with reference to the attached drawing figures, wherein:

FIG. 5 is a block diagram of an exemplary computing environment suitable for use in implementing embodiments described herein.

DETAILED DESCRIPTION

Figure 1A:
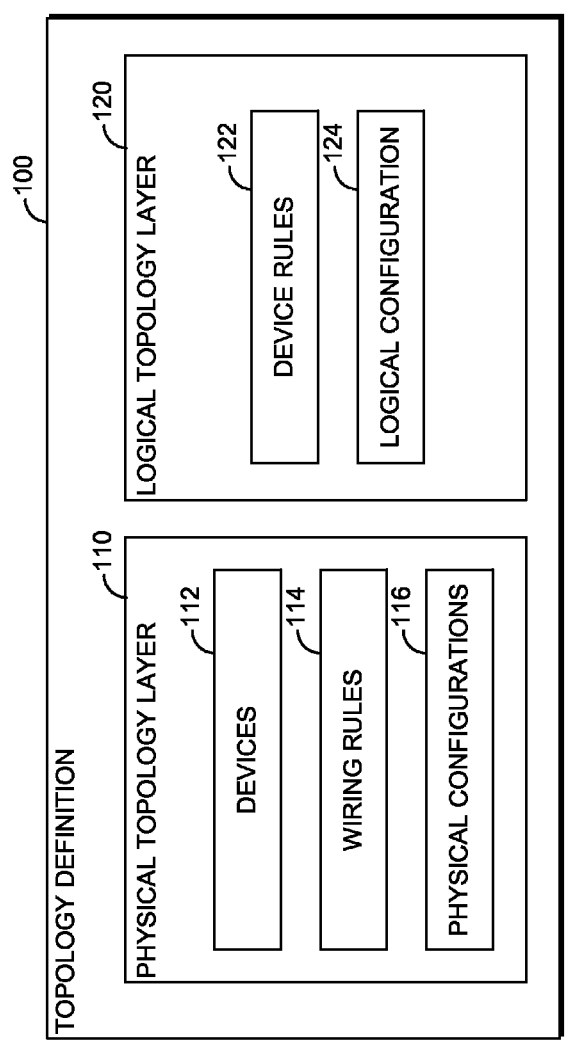
FIGS. 1A-B are schematic diagrams of a topology definition schema and precision levels, in accordance with embodiments described herein.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

For purposes of a detailed discussion below, embodiments of the present invention are described with reference to building out a hardware inventory in a datacenter using a bootstrapping workflow in cloud computing platform. However, the datacenter topology definition schema may be used for a plurality of datacenter hardware management services and bootstrapping is merely exemplary. It is contemplated that the techniques described may be extended to other implementation contexts.

As mentioned, a datacenter topology representation may be utilized in different processes in datacenter hardware management, including bootstrapping. A bootstrapping framework can refer to a comprehensive workflow to discover, verify, and configure devices, racks, and datacenters to enable the bootstrap and deployment of a cloud-computing fabric to manage the hardware inventory including computing units, blades, and network devices. Devices and hardware inventory are interchangeably used herein to broadly refer to broadly to any compilation of devices (e.g., network devices, computing devices, blades, and power-supply devices) associated with a rack, are not meant to be limited to any particular configuration of components.

In general, the hardware management process is triggered upon receiving an indication to execute a hardware management operation, e.g. create or expand computing/storage capacity of a datacenter, validate and configure hardware that was repaired, retrofitted or decommissioned existing datacenter capacity. In embodiments, the datacenter includes a plurality of nodes (e.g., physical machines or virtual machines), network devices, serial devices, power devices, and other equipment that are operably interconnected and managed via the cloud-computing fabric. The fabric provides underlying support for service applications that are distributed throughout the datacenters. In particular, portions (e.g., role instances or program components) of service applications that are distributed throughout nodes may be managed by a controller of the fabric. The fabric controller is generally responsible for various duties surrounding the monitoring, maintenance, and management of the health of computer resources, network gear, serial device, and power units that support the underlying functionality of the fabric.

Generally, hardware management services can include discovering serial and network connectivity to serial devices based on a range of ports, discovering a power distribution unit (PDU) to verify serial and network connectivity to the PDU, and discovering blades to check the wiring of the blades, harvest MAC addresses, and check blade stock keeping units (SKUs). In operation, a user device may execute a hardware management service to facilitate building out hardware inventory in different types of locations, in accordance with embodiments described herein. As such, the hardware management services may gain an understanding about an initial configuration of the hardware inventory to validate the initial configuration of the hardware inventory, ensuring the hardware inventory corresponds with an expected hardware layout (e.g., device locations, IP addresses, VLANs, and wiring) independently of data center infrastructure, and specifically a data center networking components. Additionally hardware management services may be used as part of a repair process on any hardware inventory being returned after servicing to re-discover/re-configure them back to the appropriate configuration. Similarly hardware management services may be used to reconfigure the devices during runtime if security needs require a particular device configuration changed. (e.g. blade's network disabled or turned off to prevent communication for security/investigation/reliability reasons).

The user device can access a template file (e.g., a topology definition) that describes a topology of the hardware inventory and validate the locations of the set of computing units by comparing the template file against information carried within the traffic received from the set of computing units and further validates operational configuration parameters based on expected and actual operation configuration parameters (e.g., bandwidth, throughput, latency, jitter, error rates, and interplay of factors). Bootstrapping of hardware inventory is further described in U.S. patent application Ser. No. 14/496,869, filed Sep. 25, 2014, and entitled "AUTOMATED STANDALONE BOOTSTRAPPING OF HARDWARE INVENTORY," which is incorporated herein by reference in its entirety.

Datacenter topology representations fall short in providing a comprehensive and consistent way for organizing and representing the resources in a datacenter. For example, current bootstrapping methods and systems may rely on a plurality of datacenter topology definition files for bootstrapping hardware inventory into a datacenter or cluster. In addition, several different topology files may be defined with each associated with different components and aspects of bootstrapping. In certain datacenters, each topology template file may be owned and operated by different operating groups which may lead to incomplete and inconsistent information in the topology definitions, in that, no single topology definition supports all aspects of a datacenter or cluster. Moreover, the different topology definitions may be difficult to reconcile when configured in different formats.

Further, there may be redundancy in the different definition files. In one example, certain components of the datacenter or cluster are repeated across different topology definitions. In another example, within the same topology definition, the same SKU may be repeated because no way exists of efficiently indicating multiple entries of the same hardware in the datacenter or cluster. With several topology definitions or even within an individual definition, changes to the topology cannot be incorporated in a seamless and flexible manner without significant effect to the existing definition files or workarounds to support backwards compatibility. As such, an accurate and unified representation of the datacenter topology may facilitate the process of managing hardware inventory that can include operating the hardware inventory, building out a hardware inventory and incorporating the hardware inventory into cloud computing infrastructure, hardware bootstrapping (e.g. discovering, validating, configuring, and utilizing), repair, retrofit, decommissioning of hardware inventory for a datacenter. Other variations of operating and managing hardware inventory are contemplated with embodiments of the present invention.

Embodiments of the present invention provide a simple and efficient comprehensive datacenter topology definition. At a high level, a comprehensive datacenter topology definition schema ("schema") provides a single, complete, clear, consistent and flexible schema. The schema may be applied in several different types of implementations that require a broad schema-based representation of a datacenter. The schema (e.g., an XML schema) may define constraints (e.g., physical and logical elements associated with attributes) in the structure and content of the schema that corresponds to datacenter components (e.g., attributes). The constraints can be expressed using grammatical rules governing the order of elements, data types of elements and programmatic definition of attributes, and additional specialized rules (e.g., precision levels), as described herein.

In this regard, the constraints in the definition of datacenter elements can facilitate operating a datacenter with either new or existing hardware inventory. Managing hardware can generally include discovering, validating, and configuring physical and logical elements in a datacenter, and with embodiments described herein, the physical and logical elements are defined separately in the schema. For example, a physical topology layer is associated with physical elements that define devices, wiring rules between hardware inventory, and physical configuration; and a logical topology layer is associated with logical elements that define device roles and logical configuration, the physical elements are defined separately from logical elements.

Specifically, datacenter management includes validating physical devices and blades (SKU models, firmware versions, BIOS settings etc.) in a new datacenter or cluster, validating physical wiring between devices and blades in the new datacenter or cluster, hardware devices with proper configuration settings (access settings, network configurations). It is contemplated that similar operations can be performed in an RMA (return merchandise authorization) scenario. The schema can support automating the hardware inventory management (e.g. build out) processes, in that, the schema includes a SKU definitions, wiring rules, device configuration, logical roles and configuration, in a plurality of linked files having a formalized and documented format. The topology definition schema is further extendable to support the different aspects of the automated datacenter management. For example, generating an updated topology definition (e.g., a datacenter XML file) for a datacenter controller (e.g., fabric controller) datacenter manager tool.

Advantageously, redundancy and duplication that is common in the combination of schemas (e.g., schemas supported by different support groups) or within individual schemas is eliminated based on removing common parts of SKU definitions into separate schema layers. Existing and future datacenters may utilize the schema for datacenter management services. In particular, existing and future datacenters may use the topology definitions to increase automation and simplify human input. As such, the topology definition schema provides a well-documented standard for describing comprehensive features of the datacenter.

Accordingly, in a first aspect of embodiments described herein, one or more computer storage media storing computer-useable instructions that, when used by one or more computing devices, causes the one or more computing devices to perform a method for managing datacenters based on a topology definition schema, is provided. The method includes receiving a topology definition having a physical topology layer with physical elements and a logical topology layer with logical elements. The physical elements and logical elements are defined separately from each other in a schema and correspond to attributes of a hardware inventory. The method also includes receiving an instance definition for at least one of a rack, cluster, or datacenter for a hardware management operation. The instance identifies a physical topology and a logical topology for the hardware management operation. The method further includes executing a hardware management service, based on topology definition and the instance definition, to manage the hardware inventory associated with the topology definition, wherein management of the hardware inventory corresponding to physical elements and logical elements is performed with attributes that are defined in the schema.

In a second aspect of the embodiments described herein, a data structure embodied in computer storage media as a topology definition schema is provided. The topology definition schema comprises a physical topology layer associated with physical elements, where the physical elements define devices, wiring rules between devices, and physical configuration. The topology definition schema also comprises, the topology layer associated with logical elements, where the logical elements define device roles and logical configuration. The physical elements and the logical elements are defined separately in a schema, the physical elements and logical elements corresponding to attributes of at least one of: a device, rack, cluster or datacenter such that building out of physical elements and logical elements is performed with attributes that are defined.

In a third aspect of embodiment described herein, a system for modeling or representation of hardware inventory based on topological definitions, is provided. The system includes a topology definition component configured for generating a topology definition having a physical topology layer with physical elements and a logical topology layer with logical elements, where physical elements and the logical elements are defined separately from in a schema and correspond to attributes of a hardware inventory, and where the physical elements define devices, wiring rules between devices, and physical configuration and the logical elements define device roles and logical configuration.

The topology definition component is further configured for: generating an instance definition for at least one of a rack, cluster, or datacenter, wherein the instance identifies a physical topology and a logical topology of the datacenter; and communicating the topology definition and the instance definition for a hardware management operation. The system also includes a component configured for: receiving the topology definition and the instance definition; and executing an hardware management service based on topology definition and the instance definition to manage (e.g. build out, configure) the hardware inventory associated with the topology definition, where hardware management of the hardware inventory corresponding to physical elements and logical elements is performed with attributes that are defined in the topology definition.

Figure 1B:
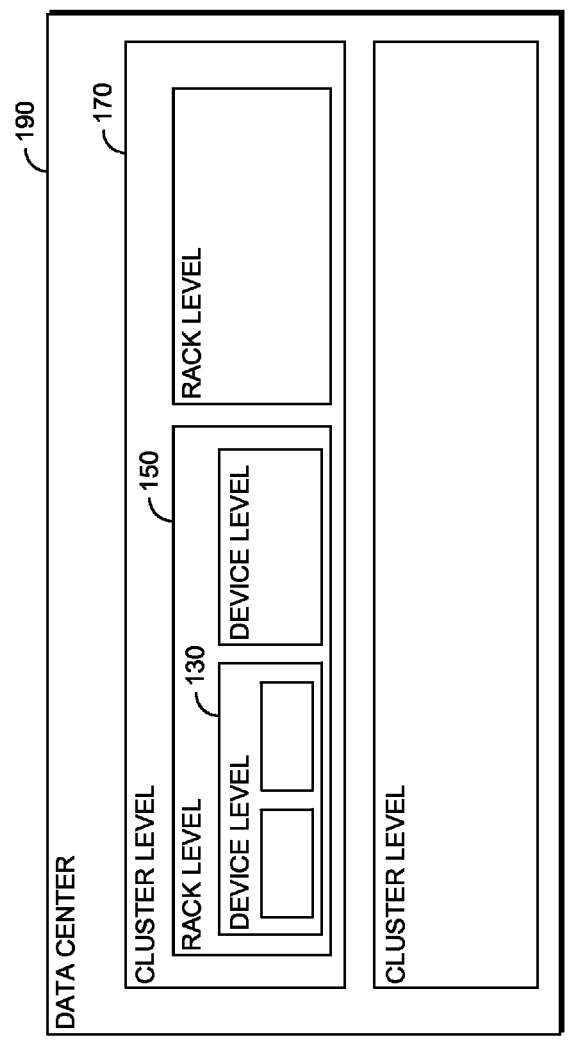

Turning now to FIGS. 1A and 1B, a schematic of a topology definition schema ("schema") comprising topology layers and precision levels for representing a data center is shown, in accordance with embodiments of described herein. The schema is based on a principle of clear separation between physical topology layer and logical topology layers. The separation of the physical topology layer and the logical topology layer can allow for location-independent information and physical implementation.

With reference to FIG. 1A, the physical topology layer 100 can include devices 112 (e.g., network devices, serial, power, and chassis device, and blades), wiring rules 114 between the devices, and a physical configuration 116 that indicates device settings that enable proper functioning of the devices. The logical topology layer 120 can include device roles 122 (e.g., top of rack switch (TOR), spine, serial aggregator, fabric, and compute). The logical topology also includes logical configuration 124 that indicate the device settings that enable proper functioning of the devices in the corresponding roles associated with the devices.

With continued reference to FIG. 1B, the schema further includes an implementation of separation in the schema defined as precision levels. A precision level indicates a hierarchical classification of topology components. Precision levels include the device level 130, the rack level 150, the cluster level 170, and the datacenter level 190. It is contemplated that additional precision levels, beyond the exemplary level identified above, can be introduced with the framework of the topology schema. Precision levels can be associated with either one or both of the physical layer or the logical layer. For example, the device level 130 can be defined in the physical layer and comprises definitions of device SKUs and blade SKUs including hardware, firmware, and configuration settings. The device level 130 can define a set of interfaces for connecting physical into racks, clusters, and datacenters.

Hardware inventory SKUs (e.g., device, blade, or rack SKU) can be used to define a class of the hardware inventory of the same manufacturer, model, and version. The hardware inventory characteristics can be based at least in part on a given SKU specification. For example, a rack and components described in the SKU specification are specifically selected and approved components for the performance and attributes expected for the rack. A SKU refers to an expected operational configuration for particular device/blade; the SKU may embody the attributes (e.g., manufacturer, product description, BIOS, firmware, configuration, material, size, color, packaging, number of HDD, versions, model, and warranty terms) associated with the hardware and distinguish the hardware from other hardware. It is contemplated that a SKU can also refer to a unique identifier or code that refers to the particular stock keeping unit.

The rack level 150 can be defined in the physical layer and logical layer having a list of devices and their corresponding logical roles, definition of wiring between devices; physical device configuration settings that are specific to the particular combination of device, and roles to the way the device are combined into a single rack. The rack level configuration exposes a set of rack interfaces for connecting racks to clusters.

The cluster level 170 can also be implemented on the physical layer and logical layer having a list of physical devices and racks and their logical roles, definitions of writing between the physical devices and racks, device configuration settings that are specific to the particular combination of physical devices or to the way the physical devices are combined. The cluster level configuration may also define the set of interfaces for connecting clusters to a datacenter.

The datacenter level 190 can also be implemented on the physical layer and logical layer having a list of physical devices and clusters and their logical roles, definitions of wiring between the physical devices and clusters, device configuration settings that are specific to the particular combination of physical devices or clusters or the way the physical devices and cluster are connected into a datacenter.

The definition patterns and syntax for topology layers and precision levels of the schema are shown in the attached appendix, in accordance with embodiments described herein. The definition patterns utilize a common semantic and syntax for representing the different resources in the datacenter. In an exemplary implementation, a schema comprises a plurality of linked files; however, it is contemplated that the schema can be implemented as a single file.

The files can be in a topology definition language. The topology definition language may be a markup language (e.g., Extensible Markup language—XML) that defines a set of rules for encoding the topology definition schema in a human-readable and machine-readable format. When the topology definition is defined as several logical files, each file may be associated with a specific topology layer (e.g., physical topology layer or logical topology layer) and precision level (e.g., device, rack, cluster, and datacenter). It is contemplated that the topology definition may be represented in a single file, where identifiers indicate the location of particular topology layers and precision levels. Other variations and combinations of representing the topology definition are contemplated with embodiments of the described herein.

Attributes of a markup element may contain both individual values (e.g., SkuID="Cisco-4948", ValidValue="64") and multiple values. In an exemplary markup element with multiple values the several rules may be applied. The rules can include: attribute values may be delimited by semicolons (e.g., ValidRole="TOR; AggSwitch; Spine; Int"). Attribute values inside curly braces may be parsed by the following rules: values may be delimited by commas (e.g. ValidValue="{1,5,9}") and numeric ranges may be specified with dashes (e.g. slot ID="{1-30}") or combination of the two (e.g. slotID="{1-5; 20-30}").

Additional multiple attribute value rules can include: dollar-sign and round brackets may be used to specify an attribute value to be taken from some other property (e.g. Value="$ (ManagementVlan)" means that the attribute value should be taken from a setting called ManagementVlan. A dot may be used in some attribute values to specify attribute value and sub-value (e.g. property of an object Value="$(ManagementVlan.Subnet)", or device port Endpoint1="NS1.45"). Square brackets at the end indicate a sub value from the value (ex. Value="$(UtilDeviceIpRange[pop])")

With reference to devices (e.g., network devices (TORs, LBs, routers, spines), serial devices, power distribution units, and blades) a SKU definition can be defined to represent the devices. It is contemplated that no separation for physical topology layer and logical topology layer exists in the device SKU definitions because devices are both physical and logical. In other words, the device includes inherent logical elements; however, the device is implemented in the physical layer, as described in more detail below. For example, the structure of device is physical but device may further comprise a logical role. In another example, devices may further have some physical settings (e.g. port state) and logical as well (e.g. VLAN configuration).

The definitions for Device SKUs (network, serial, power, blades, etc.) can include the following information:
  ID—ID of the device SKU to be referenced from rack/cluster topology definition
  ValidRole—list of valid logical roles for device (e.g., "TOR", or "Spine")
  Hardware—hardware information, including hardware Manufacturer and Model.
  Interfaces—list of device interfaces (uplinks), and their types (e.g., "Network")
  Firmware—firmware information, including Name and list of ValidVersions
  ConfigSettings—list of device configuration setting declarations, that may be available to be changed depending on physical and/or logical topology and are supported by device's driver.

Each configuration setting may have one or more Arguments, each Argument has ID and (optionally) list of ValidValues and DefaultValue. Arguments may have simple type (e.g. numeric, string, IP, IPRange), or complex type defined in the schema, e.g.:

```
<ConfigSettingType ID="Vlan">
    <Arguments>
        <Argument ID="Subnet" Type="IPRange"/>
        <Argument ID="Gateway" Type="IP"/>
        <Argument ID="Tag"/>
    </Arguments>
</ConfigSettingType>
<ConfigSettingType ID="IPConfig">
    <Arguments>
        <Argument ID="IP" Type="IP"/>
        <Argument ID="Subnet" Type="IPRange"/>
        <Argument ID="Gateway" Type="IP"/>
    </Arguments>
</ConfigSettingType>
```

The definitions of blade SKUs includes the following information:
  ID—ID of the blade SKU to be referenced from rack topology definition
  ValidRole—list of valid logical roles for blade
  Hardware—hardware information, including hardware Manufacturer and Model.
  Interfaces—list of blade interfaces (uplinks), and their types (e.g. "Network")
  Firmware—firmware information.
  configsettings—list of blade configuration setting declarations (e.g. firmware/bios), that may be available to be changed depending on physical and/or logical topology.

Turning now to physical topology definitions, as discussed earlier, the physical topology layer can include a device (e.g., network devices, serial, power, and chassis device, and blades), wiring rules between the devices, and a physical configuration that indicates hardware inventory settings that enable proper functioning of the devices. The definitions of the device level can be configured at the device level in the physical topology definition as discussed above. It is contemplated that the physical topology definition may not vary for every single rack or cluster. As such, the definitions can be advantageously created only once per entire class of racks/clusters of the same physical topology.

The definitions of the rack physical topology include the following information for the rack level:
  ID—ID of the topology to be referenced from cluster topology definition
  ValidRole—list of valid logical roles for rack
  Interfaces—list of rack interfaces (ID, Type). Rack's interface is an interface or port of some device inside the rack, which is connected (or can be connected) to some device outside the rack.
    Endpoint attribute is used to specify port/interface of the device inside the rack, which is used as a rack's interface, (e.g. Digi serial uplink comes from outside the rack, so it has to be defined as a rack's a serial interface: <Interface ID="R_COM1" Type="Serial" Endpoint="TS1.COM1"/>)
  Devices—list of devices (ID, SkuID, and va idRole) in rack.
  Blades—list of blades (ID, SkuID, and va idRole) in rack.
  WiringRules—list of physical Connections between devices and blades inside the rack. Each Connection has two endpoints (Endpoint1 and Endpoint2), which are ports or interfaces of some device or blade (e.g. <Connection Endpoint1="NS1.45" Endpoint2="TS1.NIC1"/>)
  DeviceConfigs—list of rack-specific device configuration settings for a given Device ID or Role. Only settings and allowed values from device SKU definition can be used.
  BladeConfigs—list of rack-specific blade configuration settings to be set for a given BladeID or Role.

The definitions of the cluster physical topology include the following definitions for cluster level:
  ID—ID of the topology to be referenced from cluster instance definition
  ValidRole—list of valid logical roles for rack
  Interfaces—list of cluster interfaces (ID, Type, Endpoint). Cluster interface is an interface or port of some device inside the cluster, which is connected (or can be connected) to some device outside the cluster (similar to rack's interface)
  Devices—list of devices (ID, SkuID, and ValidRole) in the cluster.
  Racks—list of racks (ID, PhysicalTopologyID, and validRole) in the cluster.
  WiringRules—list of physical Connections between devices and racks inside the cluster (similar to rack)
  DeviceConfigs—list of cluster-specific device configuration settings to be set for a given Device ID or Role.

The definitions of the datacenter physical topology include the following information for datacenter level:
  ID—ID of the topology to be referenced from datacenter instance definition
  Interfaces—list of datacenter interfaces (ID, Type, Endpoint). Datacenter interface is an interface or port of some device inside the datacenter, which is connected (or can be connected) to some device outside the datacenter (similar to rack's and cluster's interface)
  Devices—list of devices (ID, SkuID, and ValidRole) in the datacenter.
  Clusters—list of clusters (ID, PhysicalTopologyID, and ValidRole) in the datacenter.
  WiringRules—list of physical Connections between devices and clusters inside the datacenter (similar to rack and cluster)
  DeviceConfigs—list of datacenter-specific device configuration settings to be set for a given Device ID or Role.

Turning now to logical topology definitions, as discussed herein, the logical topology layer can include device roles (e.g., top of rack (TOR) switch, spine, serial aggregator, fabric, and compute). The logical topology also includes logical configuration that indicate the device settings that enable proper functioning of the devices in the corresponding roles associated with the devices. It is contemplated that the logical topology definition may not vary for every single rack or cluster. As such, the definitions can be advantageously created only once per entire class of racks/clusters of the same logical topology.

The definitions of the rack logical topology includes the following information for rack level:
  ID—ID of the topology to be referenced from cluster topology definition
  Role—role which given logical rack topology can play in cluster logical topologies
  ConfigSettings—list of configuration settings (e.g., declarations: ID, Type, Count), that can be provided to the rack from outside to make it a part of a cluster topology.
  Devices—list of device roles in rack.
  Blades—list of blade roles in rack.
  Deviceconfigs—list of logical device configuration settings to be set for a given Role. Values for those settings can be auto-defined during cluster instantiation from given sources (e.g., from rack ConfigSetting or device physical/logical properties.

The definitions of the cluster logical topology include the following information for cluster level:
  ID—ID of the topology to be referenced from cluster instance definition
  Role—role which given logical cluster topology can play in datacenter logical topologies
  ConfigSettings—list of configuration settings (declarations only: ID, Type), that must be provided to the cluster from outside to make it a part of bigger environment-datacenter.
  Devices—list of device roles in cluster.
  Racks—list of racks in cluster with theirs LogicalTopologyID and Role specified.
  Deviceconfigs—list of logical device configuration settings to be set for a given Role. Values for those settings can be auto-defined during cluster instantiation (similar to rack level).
  RackConfigs—list of rack configuration settings to be set, that must be provided to racks from outside to make it a part of cluster topology (declared in rack's ConfigSettings section). Values for those settings can be auto-defined (similar to rack level) during cluster instantiation from cluster configsettings.

The definitions of the datacenter logical topology include the following information for datacenter level:
  ID—ID of the topology to be referenced from datacenter instance definition
  ConfigSettings—list of configuration settings (declarations only: ID, Type), that must be provided to the datacenter.
  Devices—list of device roles in datacenter.

Clusters—list of cluster in a datacenter with theirs LogicalTopologyID and Role specified.

Deviceconfigs—list of logical device configuration settings to be set for a given Role. Values for those settings can be auto-defined during datacenter instantiation (similar to rack and cluster levels).

ClusterConfigs—list of cluster configuration settings to be set, that must be provided to clusters from outside to make it a part of datacenter topology (declared in cluster's ConfigSettings section). Values for those settings can be auto-defined (similar to rack and cluster levels) during datacenter instantiation from datacenter ConfigSettings.

Turning now to an instance definition, a datacenter topology definition can be implemented based on a datacenter instance definition. An instance definition (combined with physical and logical topology definitions) can include information to begin an inventory management process (e.g., bootstrapping workflow). Inventory management can be performed cluster-by-cluster, so a cluster instance may be created and provided as an input for a certain operation (e.g. bootstrapping workflow). However, in some cases a complete topology of several clusters may also be prepared (e.g., if some serial and/or network devices are shared between clusters). In such cases, a datacenter instance can be created and provided to an operation like bootstrapping workflow. In another case, a complete topology of only one rack can be implemented (e.g. return merchandise authorization (RMA) scenario), as such, a single rack instance can also be implemented.

It is contemplated that the instance definition can vary for every single rack, cluster, and datacenter, in contrast to the topology and SKU definitions above that can be created once per entire class of racks, clusters, and datacenters with the same topology.

Rack instance definition contains:
ID—ID of the rack instance
PhysicalTopologyID—ID of the physical topology used in the rack
LogicalTopologyID—ID of the logical topology used in the rack
Role—specific role which the rack plays
ConfigSettings—list of configuration settings to be set to the rack (declared in topology definitions).
Cluster instance definition contains:
ID—ID of the cluster instance
PhysicalTopologyID—ID of the physical topology used in the cluster
LogicalTopologyID αID of the logical topology used in the cluster
Role—specific role which the cluster plays
ConfigSettings—list of configuration settings to be set to the cluster (declared in topology definitions).
Datacenter instance definition contains:
ID—ID of the datacenter
PhysicalTopologyID—ID of the physical topology used in the datacenter
LogicalTopologyID—ID of the logical topology used in the datacenter
ConfigSettings—list of configuration settings to be set to the datacenter (declared in topology definitions).

Figure 2:
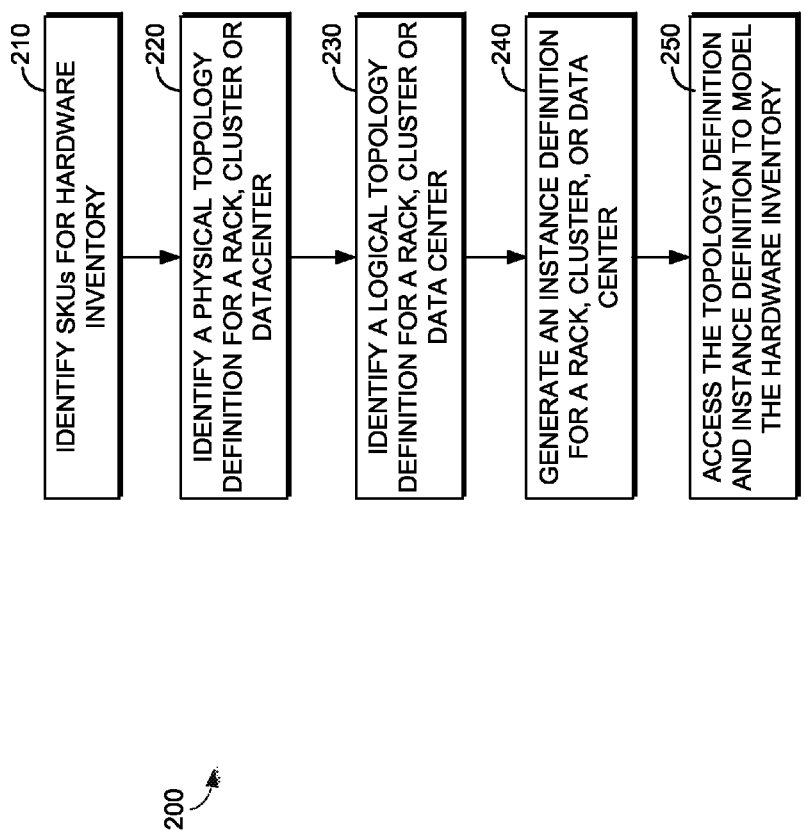
FIG. 2 is a flow diagram showing a method for modeling or representing hardware inventory based on a topology definition, in accordance with embodiments described herein.

With reference to FIG. 2, illustrates an exemplary flow chart 200 for generating a topology definition for a rack, cluster or datacenter based on the schema as described herein. The generating the topology definition can be implemented using a topology definition workflow. At block 210, the SKUs for hardware inventory (e.g., devices and blades) can be identified and retrieved. Hardware inventory may be from an Original Equipment Manufacturer (OEM) such that the hardware inventory including the newest hardware and prototypes are associated with a SKU. At block 220, a physical topology definition can be identified and retrieved for a rack, cluster or datacenter. The physical topology includes wiring rules and device configuration specific to a given type of rack, cluster or datacenter.

At block 230, a logical topology definition can be identified and retrieved for the rack, clusters, or datacenter. The logical topology includes network configuration and roles. At block 240, an instance definition file can be created for the rack, cluster and/or the datacenter. During a datacenter inventory management phase (e.g. build out, RMA), at block 250, the topology definition and instance files are referenced or accessed by a computing device that facilitates the hardware management services (e.g., a bootstrapping workflow). The computing device can for example configure devices with the topology-specific setting, validate an actual topology (physical and logical) compared to the expected topology.

The hardware management process can further include collecting extra instance-specific data (e.g., hardware inventory MAC addresses, assigned hardware inventory IP addresses etc.) and combining the instance-specific data into an updated topology instance definition file which describes the entire rack, cluster, or datacenter (e.g. cluster.xml or datacenter.xml). It is contemplated that the initial topology definition may no longer be used while the topology instance file (e.g. datacenter.xml) can be used to perform operations (e.g. deploy a fabric controller) within a rack, cluster or datacenter. Inventory management services (e.g. build out workflow, or the fabric controller) use some information from the topology instance file (e.g. datacenter.xml) to promote proper operation of the new or existing hardware inventory (e.g., load-balancer and/or router settings are extended to consider the new devices of the new hardware inventory).

Figure 3:
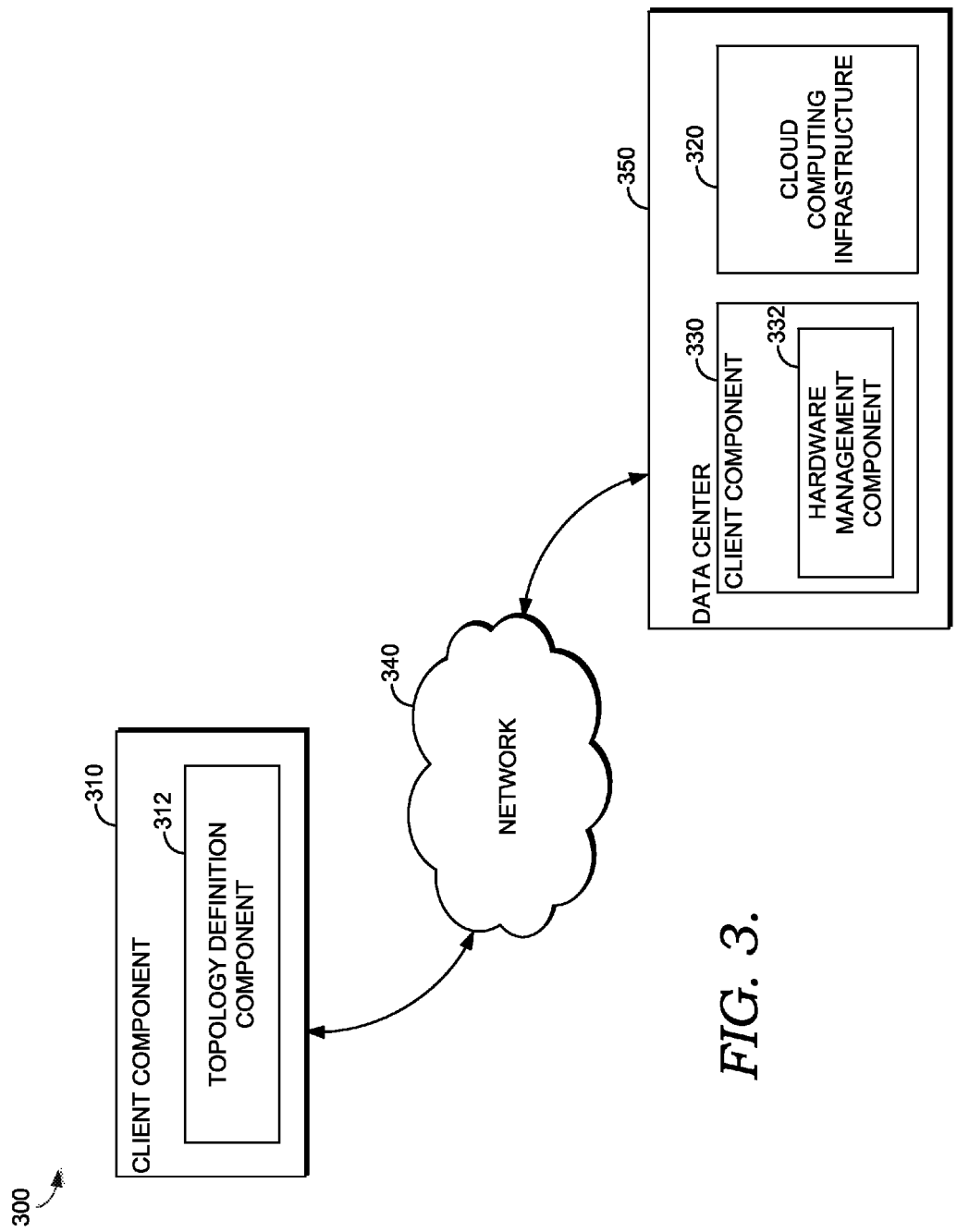
FIG. 3 is an exemplary topology definition system for performing a method for managing hardware inventory based on a topology definition, in accordance with embodiments described herein.

Turning now to FIG. 3, a block diagram depicting a topology definition system 300 in an operating environment suitable for use in implementing embodiments described herein is provided. Generally, the topology definition system 300 may be used for, among other things, defining a topology definition schema that can be used in various types of datacenter management services. As described herein, the topology definition can be specifically used for building out a datacenter in an efficient manner. The physical topology layer includes devices (e.g., network devices, serial, power, chassis device, and blades), wiring rules between the devices, and a physical configuration that indicates device settings that enable proper functioning of the devices. The logical topology layer includes device roles (e.g., top of rack (TOR) switch, spine, serial aggregator, fabric, and compute). The logical topology also includes logical configuration that indicates device settings that enable proper functioning of the device are inventory in roles associated with the devices.

Among other components not shown, the topology definition system 300 may generally include a client component 310 having a topology definition component 312, a cloud computing infrastructure 320, client component 330 having a hardware management component 332 all in communication with each other using a network 340. The network 360 may include, without limitation, one or more local area networks (LANs) and/or wide area networks (WANs). Such networking environments are commonplace in offices, enterprise-wide computer networks, intranets and the Internet. A datacenter 350 can support the client component 330 and the cloud computing infrastructure 320.

In some embodiments, one or more of the illustrated components and/or modules may be implemented as stand-alone applications. In further embodiments, one or more of the illustrated components and/or modules may be implemented via a computing device, as an Internet-based service, and/or as a module within the client components 310 and 330 and the cloud computing infrastructure 320. It will be understood by those of ordinary skill in the art that the components and modules illustrated in FIG. 3 are exemplary in nature and in number and should not be construed as limiting.

Any number of components and/or modules may be employed to achieve the functionality described herein. For example, any number of client components, cloud computing infrastructure and components thereof and networks may be employed in the topology definition system 300 within the scope of embodiments hereof. Each may comprise a single device/interface or multiple devices/interfaces cooperating in the topology definition system 300. For instance, multiple devices and/or modules arranged in a distributed environment may collectively provide the cloud neural network component and the tenant neural network component functionality described herein. The phrase "application" or "service" as used herein may broadly refer to any software, or portions of software, that run on top of, or access storage locations within, a computing device and/or multiple computing devices, such as multiple computing devices in a data center.

It should be understood that this and other arrangements described herein are set forth only as examples. Other arrangements and elements (e.g., machines, interfaces, functions, orders, and/or groupings of functions) can be used in addition to, or instead of, those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions, including the functions described below with respect to the topology definition system 300, may be carried out by a processor executing instructions stored in memory.

Turning now to the various components that may be included in the topology definition system 300, the client components 310 and 330 can be any type of computing device 500 described below with reference to FIG. 5, for example. The client component 310 implements the topology definition component 312 and the client component 330 implements the hardware management component 332.

The topology definition component 312 is responsible for generating a topology definition. The topology definition includes a physical topology layer with physical elements and a logical topology layer with logical elements. By way of example, the topology definition component 312 can receive input from other systems or an operator identifying device SKUs for a datacenter hardware inventory. It is contemplated that the topology definition may also automatically retrieve attributes of one or more elements in the topology definition. As such, attributes in the topology definition can be populated manually or automatically into the topology definition such that the attributes are programmatically defined.

The topology definition component 312 is further responsible for generating an instance definition for at least one of a rack, cluster, or datacenter. The instance identifies a physical topology and a logical topology of the datacenter. The instance can be generated and defined in a similar manner as the topology definition. The topology definition can be a single file or linked combination of files comprising the instance definition for a hardware inventory. The topology definition component 312 can define the topology definition and the instance in XML. The topology definition component can communicate the topology definition and the instance definition for hardware management of the hardware inventory.

The hardware management component 332 is responsible for executing a hardware management service to manage (e.g. build out) a hardware inventory based on the top the topology definition and the instance definition. Management of the hardware inventory corresponding to physical elements and logical elements is performed with attributes that are programmatically defined. The hardware management service (e.g., bootstrap process) can be triggered upon receiving an indication to manage (create, expand, configure, validate) computing/storage capacity of a datacenter using the topology definition and instance definition. Hardware management can include discovering serial and network connectivity to serial devices based on a range of ports, discovering a power distribution unit (PDU) to verify serial and network connectivity to the PDU, and discovering blades to check the wiring of the blades, harvest MAC addresses, and check blade stock keeping units (SKUs). In embodiments, the datacenter 350 includes a plurality of nodes (e.g., physical machines or virtual machines), network devices, serial devices, power devices, and other equipment that are operably interconnected and managed via a cloud computing infrastructure or platform.

The cloud computing infrastructure 320 can be supported by a hardware inventory in the datacenter 350. The cloud computing infrastructure 320 can rely on shared resources between the different components to maximize effectiveness of operations. The cloud computing infrastructure 320 can also interface with hardware management services that are services or applications for managing hardware inventory in a new or existing cloud computing infrastructure 320. The cloud computing infrastructure 320 can be managed by a fabric controller (not shown) as described herein.

Figure 4:
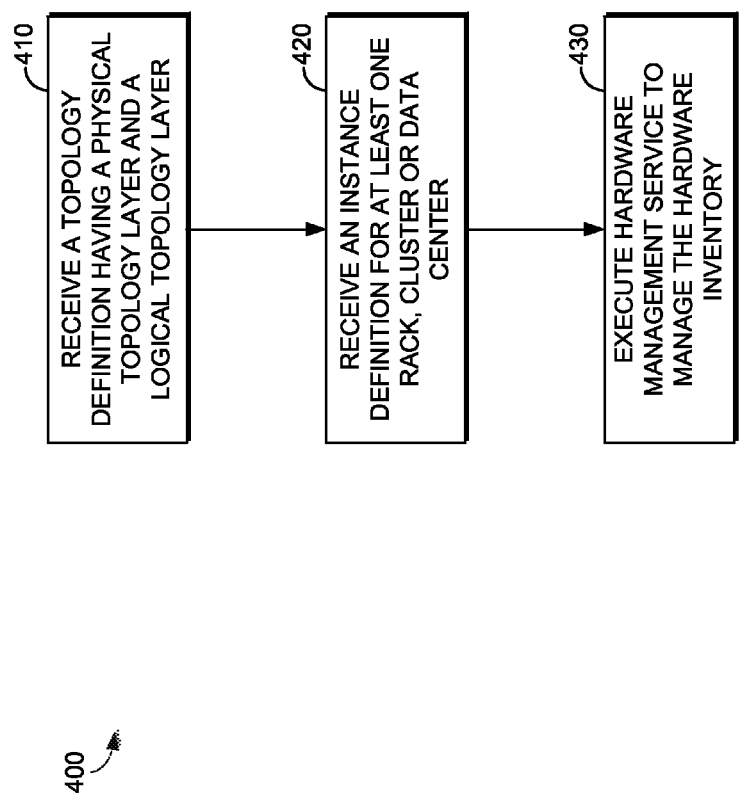
FIG. 4 is a flow diagram showing a method for managing hardware inventory based on a topology definition, in accordance with embodiments described herein.

With reference to FIG. 4, a flow chart 400 illustrating a method for operating datacenters based on a topology definition schema is provided. At block 410, a topology definition having a physical topology layer with physical elements and a logical topology layer with logical elements is received. The physical elements and logical elements are defined separately from each other in a schema and correspond to attributes of a hardware inventory. At block 420, an instance definition for at least one of a rack, cluster, or datacenter for a hardware management operation, is received. The instance identifies a physical topology and a logical topology for the hardware management operation. At block 430, a hardware management service is executed, based on a topology definition and the instance definition, to manage the hardware inventory associated with the topology definition. Management of the hardware inventory corresponding to physical elements and logical elements is performed with attributes that are programmatically defined in the schema.

In embodiments, management of the hardware inventory specifically includes security configurations. In operation, network security configurations can be performed on hardware inventory. Network security configurations can be specifically performed for one or more blades. Different roles can be assigned to the one or more blades based on a network security configuration associated with a selected blade. Upon assigning a role to the one or more blades an Internet Protocol (IP) configuration can be provided to the one or blades. The one or more blades can be booted and utilized within the applied network security configuration in their assigned roles within a cluster.

Having briefly described an overview of embodiments of the present invention, an exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output ports 118, input/output components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. One or more computer storage media storing computer-useable instructions that, when executed by one or more processors, causes the one or more processors to perform a method for operating datacenter hardware inventory based on a topology definition schema, the method comprising:

receiving a topology definition having a first schema layer as a physical topology layer with physical elements and a second schema layer as a logical topology layer with logical elements, wherein physical elements and logical elements are defined separately from each other in a schema having the first schema layer and the second schema layer separately defined and corresponding to attributes of a hardware inventory, wherein the schema is a structured specified representation of constraints of the physical elements and the logical elements;

receiving an instance definition for at least one of a rack, cluster, or datacenter for a hardware management operation, wherein the instance identifies a physical topology having the physical elements corresponding to the physical topology layer of the schema and a logical topology having the logical elements corresponding to the logical topology layer of the schema for the hardware management operation; and executing a hardware management service to perform the hardware management operation, based on the topology definition and the instance definition, to manage the hardware inventory associated with the topology definition, wherein managing the hardware inventory corresponding to the physical elements and the logical elements is performed with attributes that are defined in the schema, wherein the hardware management service comprises validating an actual topology corresponding to the physical topology or the logical topology based on an expected topology in the topology definition.

2. The media of claim 1, wherein the physical elements define devices, wiring rules between devices, and physical configuration and the logical elements define device roles and logical configuration.

3. The media of claim 1, wherein physical elements and the logical elements of devices, racks, clusters, and the datacenter are further defined in precision levels of the topology definition schema, wherein a precision level indicates a hierarchical classification of topology components, the precision levels include a device level, a rack level, a cluster level, and a datacenter level.

4. The media of claim 3, wherein the topology definition physical layer further comprises:
a device level definition generated based on identifying device attributes, wherein the device attributes are associated with a plurality of device level elements.

5. The media of claim 3, wherein the topology definition physical layer further comprises:
a physical rack level definition generated based on identifying rack level physical rack attributes, wherein the physical rack attributes are associated with rack level physical elements;
a physical cluster level definition based on identifying cluster level physical cluster attributes, wherein the physical rack attributes are associated with cluster level physical elements; and
a physical datacenter level definition based on identifying datacenter level physical datacenter attributes, wherein the physical datacenter attributes are associated with datacenter level physical elements.

6. The media of claim 3, wherein the topology definition logical layer further comprises:
a logical rack level definition generated based on identifying rack level logical rack attributes, wherein the logical rack attributes are associated with rack level logical elements;
a logical cluster level definition based on identifying cluster level logical cluster attributes, wherein the logical cluster attributes are associated with cluster level logical elements; and
a logical datacenter level definition generated based on identifying datacenter level logical datacenter attributes, wherein the logical topology layer attributes are associated with datacenter logical physical elements.

7. The media of claim 1, wherein managing the hardware inventory further comprises:
configuring the hardware inventory with topology-specific settings in the topology definition;
validating the actual physical topology based on comparing the actual physical topology with the expected physical topology in the topology definition; and
validating the actual logical topology based on comparing the actual logical topology with the expected logical topology in the topology definition.

8. The media of claim 7 further comprising:
aggregating instance-specific data for the hardware inventory; and
generating an updated topology definition based on combining the instance-specific data with the topology definition.

9. The media of claim 1, wherein managing the hardware inventory further comprises:
performing network security configurations for one or more blades;
assigning different roles to the one or more blades based on a network security configuration; and
providing Internet Protocol (IP) configuration, booting, and utilizing one or more blades within the applied network security configuration in their assigned roles within a cluster.

10. A computer-implemented method for operating datacenter hardware inventory based on a topology definition schema, the method comprising:
accessing a physical topology layer of a topology definition, wherein the physical topology layer is associated with physical elements; and
accessing a logical topology layer of the topology definition, wherein the logical topology layer is associated with logical elements, wherein the logical elements define device roles and logical configuration,
wherein the physical elements and the logical elements are defined separately in a schema of the topology definition, wherein the schema is a structured specified representation of constraints of the physical elements and the logical elements;
accessing an instance definition for at least one of a rack, cluster, or datacenter for a hardware management operation, wherein the instance identifies a physical topology having the physical elements corresponding to the physical topology layer of the schema and a logical topology having the logical elements corresponding to the logical topology layer of the schema for the hardware management operation; and
executing a hardware management service to perform the hardware management operation, based on the topology definition and the instance definition, to manage the hardware inventory associated with the topology definition, wherein managing the hardware inventory corresponding to the physical elements and the logical elements is performed with attributes that are defined in the schema, wherein the hardware management service comprises validating an actual topology corresponding to the physical topology or logical topology based on an expected topology in the topology definition.

11. The method of claim 10, wherein the physical elements define devices, wiring rules between devices, and physical configuration.

12. The method of claim 11, further comprising:
the rack instance having rack instance elements comprising one or more of: an identifier, a physical topology identifier, a logical topology identifier, a role, and configuration settings;
the cluster instance having cluster instance elements comprising one or more of: an identifier, a physical topology identifier, a logical topology identifier, a role, and configuration settings; and
the datacenter instance having datacenter instance elements comprising one or more of: an identifier, a physical topology identifier, a logical topology identifier, and configuration settings.

13. The method of claim 10, wherein the device level elements include one or more of: an identifier, a valid role, hardware information, an interface, firmware, and configuration settings.

14. The method of claim 10, wherein device level elements and attributes for the valid role for a blade are different from device level elements and attributes for the valid role for a device.

15. The method of claim 10, further comprising physical elements having:
rack level physical elements comprising one or more of: an identifier, a valid role, an interface, a device, a blade, wiring rules, a device configuration, and blade configuration;
cluster level physical elements comprising one or more of: an identifier, a valid role, an interface, a device, wiring rules, and device configuration; and
datacenter level physical elements comprising one or more of: an identifier, a valid role, an interface, a device, a blade, wiring rules, and a device configuration.

16. The method of claim 10, further comprising logical elements having:
rack level logical elements comprising one or more of: an identifier, a role, configuration settings, device roles, blade roles, and device configurations;
cluster level logical elements comprising one or more of: an identifier, a role, configuration settings, device roles, a rack, device configurations, and a rack configurations; and
datacenter level logical elements comprising one or more of: an identifier, configuration settings, device roles, a cluster, device configurations, cluster configurations, and configuration settings.

17. A system for managing hardware inventory based on topology definitions, the system comprising:
a topology definition component configured for:
generating a topology definition having a physical topology layer with physical elements and a logical topology layer with logical elements, wherein physical elements and the logical elements are defined separately from each other in a schema and correspond to attributes of a hardware inventory;
generating an instance definition for at least one of a rack, cluster, or datacenter, wherein the instance identifies a physical topology and a logical topology of the datacenter; and
communicating the topology definition and the instance definition for a hardware management operation;
a hardware management component configured for:
receiving the topology definition and the instance definition;
executing a hardware management service to perform the hardware management operation based on the topology definition and the instance definition to manage the hardware inventory associated with the topology definition, wherein managing of the hardware inventory corresponding to physical elements and logical elements is performed with attributes that are defined, and wherein the hardware management service comprises validating an actual topology corresponding to the physical topology or the logical topology based on an expected topology in the topology definition schema.

18. The system of claim 17, wherein physical elements and the logical elements of devices, racks, clusters, and the datacenter are further defined in precision levels of the topology definition schema, wherein a precision level indicates a hierarchical classification of topology components, the precision levels include a device level, a rack level, a cluster level, and a datacenter level.

19. The system of claim 18, further comprising the hardware management component configured for:
configuring the hardware inventory with topology-specific settings in the topology definition;
validating the actual physical topology based on comparing the actual physical topology with the expected physical topology in the topology definition; and
validating the actual logical topology based on comparing the actual logical topology with the expected logical topology in the topology definition.

20. The system of claim 19, wherein physical elements and inherent logical elements of devices are categorized in the physical topology layer, wherein inherent logical elements correspond to logical attributes that are inherent in a structurally physical device.

* * * * *